United States Patent
Fukushima et al.

(10) Patent No.: US 8,842,326 B2
(45) Date of Patent: Sep. 23, 2014

(54) IMAGE PROCESSING DEVICE
(71) Applicant: Sharp Kabushiki Kaisha, Osaka (JP)
(72) Inventors: Atsuhiko Fukushima, Nara (JP); Yuji Okamoto, Kyoto (JP); Toshihiro Yamanaka, Nara (JP); Toshihiko Fukuhara, Nara (JP); Shuhji Fujii, Kyoto (JP); Tatsuo Nomura, Kyoto (JP); Syouichirou Yoshiura, Nara (JP); Tsutomu Yoshimoto, Nara (JP)
(73) Assignee: Sharp Kabushiki Kaisha, Osaka-Shi, Osaka (JP)
(*) Notice: Subject to any disclaimer, the term of this patent is extended or adjusted under 35 U.S.C. 154(b) by 0 days.
(21) Appl. No.: 14/175,198
(22) Filed: Feb. 7, 2014
(65) Prior Publication Data
US 2014/0153034 A1  Jun. 5, 2014

Related U.S. Application Data

(63) Continuation of application No. 13/759,405, filed on Feb. 5, 2013, now Pat. No. 8,705,075, which is a
(Continued)

(30) Foreign Application Priority Data

May 30, 2002 (JP) ................. 2002-157780
Sep. 20, 2002 (JP) ................. 2002-275098
Oct. 30, 2002 (JP) ................. 2002-315644
Oct. 30, 2002 (JP) ................. 2002-315645

(51) Int. Cl.
| G06F 3/12 | (2006.01) |
| H04N 1/00 | (2006.01) |
| G06F 21/62 | (2013.01) |
| H04N 1/21 | (2006.01) |
| G06F 17/30 | (2006.01) |
| G06F 21/60 | (2013.01) |

(52) U.S. Cl.
CPC ........ H04N 1/00856 (2013.01); G06F 21/6209 (2013.01); H04N 2201/218 (2013.01); H04N 1/00877 (2013.01); H04N 1/21 (2013.01); G06F 17/30244 (2013.01); H04N 2201/0094 (2013.01); G06F 21/608 (2013.01); G06F 2221/2143 (2013.01); H04N 1/00408 (2013.01)
USPC ........ 358/1.16; 358/1.13; 358/1.14; 358/1.15

(58) Field of Classification Search
CPC ................. G06F 2221/2143; G06F 3/0652; H04N 1/00413; G11B 5/024
USPC ............. 358/1.13–1.17; 360/60, 66; 713/193, 713/163
See application file for complete search history.

(56) References Cited

U.S. PATENT DOCUMENTS 6,104,499 A * 8/2000 Yamada ................ 358/1.15
6,731,447 B2 * 5/2004 Bunker et al. ........... 360/60
(Continued)

FOREIGN PATENT DOCUMENTS

JP    09-284572    10/1997
JP    11-234493    8/1999
(Continued)

OTHER PUBLICATIONS

Ontrack Data International, Inc., "DataEraser Users Manual," http://web.archive.org/web/20010602175100/www.ontrack.com/libraryldeman-e.pdf (May 6, 2005).
(Continued)

*Primary Examiner* — Dennis Dicker
(74) *Attorney, Agent, or Firm* — Edwards Wildman Palmer LLP; David G. Conlin; George N. Chaclas

(57) ABSTRACT

An image processing device comprises an image data input means 2, an image data storage means 12 for storing the image data being input, an image data processing means 6 having multiple processing modes for outputting the stored image data, and a image data erasing means for erasing the image data stored in the storage means 12. The device further comprises erase count control means 8, 14 for controlling the number of times for erasing image data capable of having the number of times of erase set arbitrarily according to the security level required for each mode, and capable of having the set number of times of erase changed in mid-flow. Confidentiality is protected by performing erase operations repeatedly to the region storing the unnecessary image data according to the security level.

12 Claims, 12 Drawing Sheets

Related U.S. Application Data continuation of application No. 13/465,342, filed on May 7, 2012, now Pat. No. 8,373,886, which is a continuation of application No. 10/504,393, filed as application No. PCT/JP03/06774 on May 29, 2003, now abandoned.

(56) References Cited

U.S. PATENT DOCUMENTS

| | | | |
|---|---|---|---|
| 7,126,707 B2 * | 10/2006 | Takeo et al. | 358/1.15 |
| 7,170,622 B2 | 1/2007 | Nobuhara et al. | |
| 7,283,269 B2 * | 10/2007 | Tanimoto | 358/1.15 |
| 7,325,052 B1 * | 1/2008 | Motoyama | 709/223 |
| 7,471,408 B2 * | 12/2008 | Ueda et al. | 358/1.15 |
| 7,669,060 B2 * | 2/2010 | Fujiwara et al. | 713/193 |
| 7,710,591 B2 | 5/2010 | Kinoshita | |
| 7,826,078 B2 | 11/2010 | Okamoto et al. | |
| 7,936,467 B2 | 5/2011 | Shimizu | |
| 8,373,886 B2 * | 2/2013 | Murakami et al. | 358/1.16 |
| 2001/0024292 A1 * | 9/2001 | Otake | 358/1.15 |
| 2001/0025343 A1 * | 9/2001 | Chrisop et al. | 713/193 |
| 2002/0171867 A1 * | 11/2002 | Nobuhara et al. | 358/1.15 |
| 2004/0012812 A1 | 1/2004 | Shimizu | |
| 2005/0213151 A1 * | 9/2005 | Yajima et al. | 358/1.15 |
| 2006/0139680 A1 | 6/2006 | Okamoto et al. | |
| 2007/0208915 A1 * | 9/2007 | Tran et al. | 711/159 |

FOREIGN PATENT DOCUMENTS

| | | |
|---|---|---|
| JP | 11-252303 | 9/1999 |
| JP | 11-341243 | 12/1999 |
| JP | 2001-111798 | 4/2001 |
| JP | 2001-309099 | 11/2001 |

OTHER PUBLICATIONS

International Search Report mailed Sep. 16, 2003 in corresponding PCT Application No. PCT/JP03/06774.

National Industrial Security Program Operating Manual (NISPOM) [online], Washington, D.C.: Department of Defense, Department of Energy, Nuclear Regulatory Commission & central INtelligence Agency, Jan. 1995, [retrieval date Sep. 1, 2003, retrieval via internet <URL: http://www.dss.mil/isec/nispom_0195.htm>, Chapter 8, Secion 3, 8-306.

Manual for Employing Joint Tactial communications, Joint Communications Security [online], Washington, DC: Joint Staff, Nov. 2, 1998, [retrieval date Sep. 1, 2003, retrieval via internet ,URL: http://www.politrix.org/foia/unsorted/cjcsm623105a.htm.; chapter I, Section 9, b.

Department of Defense Trusted Computer System Evaluation Criteria [online], Washginton, DC: Department of Defense, Dec. 26, 1985, [retrieval date Sep. 1, 2003, retrieval via internet ,URL: http://www.radium.ncsc.mil/tpsp/library/rainbow/5200.28-STD.html., Part I, 2.2.1.2, 3.1.1.2, 3.2.1.2, 3.3.1.2, 4.1.1.2 & Glossary.

* cited by examiner

IMAGE PROCESSING DEVICE

CROSS-REFERENCE TO RELATED APPLICATIONS

This application is a continuation of U.S. patent application Ser. No. 13/759,405, filed Feb. 5, 2013, allowed, which is a continuation of U.S. patent application Ser. No. 13/465,342, filed May 7, 2012, now U.S. Pat. No. 8,373,886, which is a continuation of U.S. patent Ser. No. 10/504,393, filed Aug. 10, 2004, abandoned, which is the U.S. national phase of PCT Patent Application No. PCT/JP03/06774, filed May 29, 2003, which claims priority to Japanese Patent Application No. 2002-157780, filed May 30, 2002, Japanese Patent Application No. 2002-275098, filed Sep. 20, 2002, Japanese Patent Application No. 2002-315645, filed Oct. 30, 2002 and Japanese Patent Application No. 2002-315644, filed Oct. 30, 2002. The contents of the foregoing applications are incorporated herein by reference in their entirety.

TECHNICAL FIELD

The present invention relates to an image processing device such as a digital multifunctional device including a scanner and a printer, and preferably relates to an image processing device connected to a communication path such as a network and having, in addition to the copier function mentioned above, an image communicating function and a printer function, and more specifically, relates to an image processing device that temporarily stores the image data inputted to the multifunctional device in a memory equipped thereto so as to process the input image data, and erases the stored image data from the memory when the processing is completed.

DESCRIPTION OF THE BACKGROUND ART

Conventionally, digital multifunctional devices are available in the market for electronically scanning a document image by a scanner and outputting the image data transmitted from the scanner through a printer. Recently, improved digital multifunctional devices have appeared, equipped with a communication function (including a facsimile function and a printer function) to transmit and receive image data through communication with external devices. Further, the improved digital multifunctional devices are equipped with memories for temporarily storing the image data to be processed, so as to process large amounts of image data and multiple jobs efficiently.

On the other hand, there are various types of memories or storage devices for storing the image data, including hard disk devices using magnetic recording medium, and semiconductor memories. Such various memories have different environments for storing the image data, such as the memory capacity, cost, writing speed, readout speed, and whether it is volatile or nonvolatile.

Especially in a memory utilizing a magnetic recording medium such as a hard disk device, the disk (recording medium) is divided into small units, and each region is managed by a management data called FAT (file allocation table). When data is recorded in a region of the disk (recording medium), the FAT data is updated accordingly, and when reading out the data stored in the regions, the reading is performed based on the FAT data.

Currently, the hard disk device is disposed in the digital multifunctional device as an auxiliary memory of the semiconductor memory, considering memory capacity, price (cost of parts), and data transmission speed, and while a certain volume of job data are processed in the semiconductor memory, the newly input job data is temporarily stored in the hard disk, so that when the order for processing the new job data arrives, the data is read out onto the semiconductor memory for processing. The above configuration is provided in the market as a system for processing image data (digital multifunctional device) capable of efficiently processing a large amount of job data without delay.

However, the processing of a highly confidential document data by this type of digital multifunctional device may cause security problems. For example, the job data (image data) stored temporarily in each of the regions of the hard disk remain as data even when the job data has become unnecessary and the FAT data has been updated to store new image data, unless the newly inputted image data is overwritten on the region storing the unnecessary image data based on the FAT data, or unless the unnecessary image data remaining in the data regions are erased forcibly.

In order to overcome this drawback, Japanese Patent Laid-Open Publication No. 9-284572 discloses a system that forcibly erases the region storing the image data of the hard disk or overwrites irregular patterned images created by random numbers on the region when the processing of the image data is completed in the digital multifunctional device, so that the stored data cannot be reproduced as image.

However, strictly speaking, since the memory is composed of a magnetic storage medium, the previously stored image data is not completely impossible to read even after overwriting new image data or specific pattern on the data once, or by erasing the data.

Therefore, the present invention aims at solving the above-mentioned problems of the prior art. The object of the invention is achieved by providing an image processing device that, upon erasing the image data stored in the memory, repeats erasing operation for the regions storing the image data according to its security level so as to achieve sufficient protection of confidentiality of the image data.

Another object of the present invention is to provide an image processing device that enables the number of times of erase (erase count) to be designated from an external device corresponding to the security level of the image data when the processing of the image data is requested from the external device, in case the digital multifunctional device is equipped with a device having a communication function that enables image data to be transmitted to and received from an external device through communication. Thus, the unnecessary image data stored in the image data storage means can be erased without fail by performing erase of the image data for a number of times designated through the external device, according to which the security level of the device with respect to the image data received from the external device via the image data communication means is increased.

Yet another object of the present invention is to provide an image processing device that performs erase operation based on the preset number of times for erasing the image data set in the digital multifunctional device, and when the digital multifunctional device is equipped with a device having a communication function that enables image data to be transmitted to and received from an external device through communication, when a request for image data processing is entered through the external device, enables the erase count according to the security level of the image data to be designated through the external device, and performs erase operation by prioritizing the erase count of image data designated through the external device to the erase count of image data preset to the digital multifunctional device.

DISCLOSURE OF THE INVENTION

The present invention achieves the above-mentioned objects by an image processing device comprising an image data input means for inputting image data, an image data storage means for storing the image data inputted through the image data input means, an image data processing means for outputting the image data stored in the image data storage means, and an image data erasing means for erasing the image data stored in the image data storage means, wherein the image processing device further comprises an erase count control means for performing the erase operation to the image data to be erased by the image data erasing means for multiple times.

Further, according to the image processing device of the present invention, in addition to the above features, if the image data processing means has multiple different processing modes, the erase count control means is capable of arbitrarily setting up the number of times of erase according to a required security level for each of the processing modes by which the image data to be erased is outputted.

In addition to the above features of the image processing device of the present invention, if the image data processing means has multiple varying processing modes, the erase count control means is capable of arbitrarily setting up the number of times of erase operation according to a required security level for each of the processing modes by which the image data to be erased is outputted, and also capable of changing in mid-flow the number of times of erase being set.

As explained, by repeatedly erasing the stored image data to be erased for a set number of times according to the process mode, the stored image data can be erased without fail according to its security level, so the security of the image data can be improved. Furthermore, by enabling the total number of erase operation to be varied in mid-flow during erase of the stored image data, the number of times for erasing the stored image data can be increased or decreased according to its security level, and the security level of the image data can be increased. Moreover, the present invention prevents deterioration of processing efficiency of the device by carrying out erase operations not more than necessary.

Furthermore, according to the image processing device of the preset invention, in addition to the features mentioned above, the erase count control means is equipped with an erase count setup means for arbitrarily setting up the number of times for erasing the image data by the image data erasing means according to each processing mode, and an erase count changing means for changing in mid-flow the number of times of erase being set. As explained, by allowing the number of times for erasing the image data by the image data erase means to be set arbitrarily, the most suitable number can be set to correspond to the environment of the installation site (various handling levels for various document images at the installation site) by which the security level is increased, and on the other hand, the erase operation is not repeated more than necessary, so the process efficiency of the image data of the image processing device is not deteriorated. Further, while erasing the stored image data to be erased, the number of times of erase operation can be varied in mid-flow, so that the erase count can be increased or decreased according to the security level of the stored image data, thus the security level of the image data can be increased.

According further to the present invention, the object of the present invention can be achieved by an image processing device comprising an image data reading means for inputting image data, an image data communicating means for communicating the image data with an external device, an image data storage means for storing the image data inputted from the image data reading means and from the external device via the image data communicating means, an image data processing means for outputting the image data stored in the image data storage means, and an image data erasing means for erasing the image data stored in the image data storage means, wherein the image data erasing means is equipped with a function to receive via the image data communicating means from the external device the image data and the number of times for erasing the image data, and a function to erase the unnecessary image data stored in the image data storage means based on the number of times for erasing the image data designated by the external device.

Further in addition to the above features, the image processing device of the present invention comprises an image data erase count setup means for setting the number of times for erasing the image data stored in the image data storage means, wherein the image data erasing means is equipped with a function to receive the set number of times for erasing the image data from the image data erase count setup means, a function to receive via the image data communicating means from the external device the image data and the number of times for erasing the image data, and a function to erase the unnecessary image data stored in the image data storage means based on the number of times for erasing the image data designated from the external device, by prioritizing the number of times for erasing the image data designated from the external device over the number of times for erasing the image data set in advance through the image data erase count setup means.

In addition to the features of the image processing device of the present invention mentioned above, the image data storage means is a storage device equipped with a magnetic memory medium. By forming the image data storage means with a magnetic memory medium, the image data stored in the magnetic memory device can be erased without fail and the security level of the image data is further enhanced.

According to the image processing device of the present invention, the number of times for erasing the image data is the number of times for either erasing or overwriting a storage region of the unnecessary image data to be erased.

According to the invention, the number of times for erasing the image data can be set and varied arbitrarily according to the security level of the image data.

The "erasing" of image data according to the present invention is not limited to simply erasing (clearing) the image data, but also includes making it impossible to read the image data (invalidation) by overwriting white image data or unspecified pattern image formed by random number generation to the image data region.

BEST MODE FOR CARRYING OUT THE INVENTION

Figure 1:
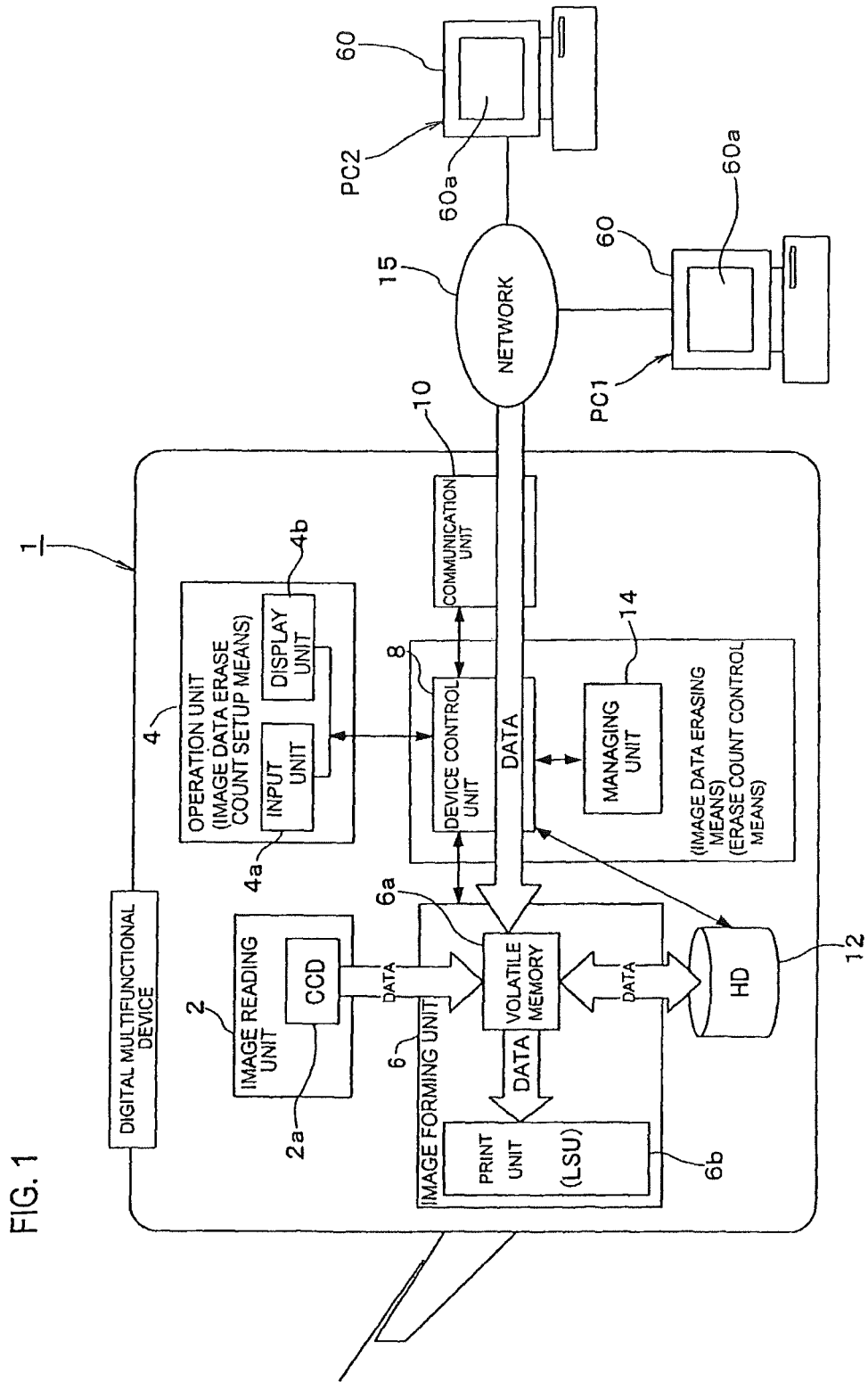
FIG. 1 is an explanatory view showing the schematic configuration of a digital multifunctional device or image processing device according to one embodiment of the present invention.

One preferred embodiment of the image processing device according to the present invention will now be explained with reference to the drawings. FIG. 1 is an explanatory view showing the schematic configuration of the digital multifunctional device which is the image processing device according to one embodiment of the present invention.

As shown in FIG. 1, the digital multifunctional device 1 according to the embodiment comprises an image reading unit 2, an operation unit 4, an image forming unit 6, a device control unit 8, a communication unit 10, a hard disk (HD) 12 and a managing unit 14.

The image reading unit 2 comprises, for example, as shown in FIG. 1, a CCD (charge coupled device) 2a as image reading device, which is an image data reading means for reading the image data, and functions as one of the image data input means for inputting the image data.

The operation unit 4 comprises, as shown in FIG. 1, an input unit 4a equipped with various input keys etc. and a display unit 4b equipped with an LCD (liquid crystal display) or other display means, and functions as means for manipulating the device, entering the number of times of erase and displaying the number of times of erase, and also as an image data erase count setup means for setting the number of times of erase for the image data stored in the hard disk 12 functioning as the image data storage means.

The image forming unit 6 comprises, as shown in FIG. 1, a volatile memory 6a and a print unit 6b such as an LSU (laser scanning unit), and functions as image data processing (output) means for processing (outputting) the image data stored in the image data storage means or hard disk 12.

The device control unit 8 and the managing unit 14 function as image data erase means for erasing (invalidating) the image data stored in the hard disk 12 based on a program set optionally.

Furthermore, the device control unit 8 and the managing unit 14 also function as erase count control means for erasing the object image data for a number of times repeatedly by the image data erase means according to an optionally set program.

The communication unit 10 controls the communication between an external network 15, and functions as image data communication means for communicating image data with external devices PC1, PC2 . . . connected to the network 15, and also functions as one of the image data input means for inputting image data to the image data storage means.

The hard disk 12 functions as an image data storage means for storing the image data inputted through various input means (input means corresponding to various modes of the digital multifunctional device 1; such as scanner, facsimile and network). The image data storage means can be constructed as a memory unit having a magnetic recording medium.

The managing unit 14 manages the whole device and also manages processes such as the erasing of unnecessary data.

According to the digital multifunctional device 1 of the present invention, the image data erase means for erasing the unnecessary image data stored in the hard disk 12 is equipped with a function to receive the number of times for erasing the image data set through the operation unit 4, a function to receive the image data and the number of times for erasing the image data from external device PC1, PC2 and so on via a communication unit 10, and a function to erase the unnecessary image data stored in the hard disk 12 according to the number of times for erasing the image data designated through the external device PC1, PC2 and so on by prioritizing the number of times for erasing the image data designated through the external device PC1, PC2 and so on over the number of times for erasing the image data set in advance through the operation unit 4.

According to the digital multifunctional device 1 of the present invention, the number of times for erasing the image data is the number of times for either erasing or overwriting the memory region storing the unnecessary image data to be erased.

When the digital multifunctional device 1 according to the present embodiment is used as a copying machine, the image data of the document being read in through the image reading unit 2 is output from the image forming unit 6 as copy.

As shown in FIG. 1, the image reading unit 2 is equipped with a CCD 2a capable of electronically reading the image of the document set to reading position. The image data of the document being read is completed as output image on a volatile memory 6a and then stored in the hard disk 12 temporarily. When there are multiple documents, this reading and storing operation is performed repeatedly.

Thereafter, based on the processing mode designated through the operation unit 4, the image data stored in the hard disk 12 are read out sequentially at appropriate timings and sent to the volatile memory 6a. Then, in timing with the writing of the data to the print unit 6b, the image data is transferred from the volatile memory 6a to the print unit 6b.

Further, when the image data being input are to be printed out as multiple copies, the image data is stored in page units to the hard disk 12 as output image, and in response to the output mode, the data is sent from the hard disk 12 to the volatile memory 6a, and then transferred therefrom to the print unit 6b repeatedly for a number of times corresponding to the number of copies to be output in timing with the writing of data to the print unit 6b.

Next, in utilizing the digital multifunctional device 1 according to the present embodiment as a printer, the image data received by the communication unit 10 is output from the image forming device 6 via the volatile memory 6a.

As shown in FIG. 1, the communication unit 10 is connected with a network 15 via a communication cable and the like, and can receive image data from external devices such as personal computers (PC) PC1, PC2 and so on connected to the network 15. The image data received by the communication unit 10 are sent in page units as image data for output to the volatile memory 6a, and then stored in the hard disk 12 temporarily. Thereafter, the image data is sent again from the hard disk 12 to the volatile memory 6a before being transferred to the print unit 6b, similarly as when the device is used as a copying machine.

Moreover, when utilizing the digital multifunctional device 1 according to the present embodiment as a network scanner, the image data of the document being read in through the image reading unit 2 can be transmitted through the communication unit 10 to an external device (PC1, PC2 and so on) such as an arbitrary personal computer.

Also in this example, the CCD 2a equipped to the image reading unit 2 is used to read the document image electronically. Then, the document image data being read is completed as output image on the volatile memory 6a and then stored in the hard disk 12 temporarily. Thereafter, the data is sent from the hard disk 12 back to the volatile memory 6a, and based on the instructions provided through the operation unit 4, a communication between a designated destination is established, and the data is transmitted via the communication unit 10 to a target destination.

Other than the network 15, the communication unit 10 is connected with a telephone circuit (not shown), so that when the digital multifunctional device 1 according to the present embodiment is utilized as a facsimile, a similar operation is performed, and document image can be transmitted to and received from external communication devices.

In the present explanation, the digital multifunctional device 1 is equipped with a hard disk 12 functioning as storage means for temporarily storing the image data, but the present invention is not limited to such example, and the digital multifunctional device 1 can also be equipped with a nonvolatile memory capable of maintaining the stored image data even when it is removed from the device body, or a memory having a backup function, or other memory units (media) utilizing magnetic recording media.

Each component constituting the digital multifunctional device 1 according to the present embodiment is controlled via the device control unit 8, which monitors the instructions for operation entered through the input unit 9a, such as tablets and key groups, equipped to the operation unit 4, and displays the guidance information to be notified to the user, such as information related to the status of the digital multifunctional device 1, via the display unit 4b.

The managing unit 14 manages the information related to the various units or components controlled by the device control unit 8, and based on this information, the device control unit 8 controls the overall operation of the digital multifunctional device 1.

Figure 2:
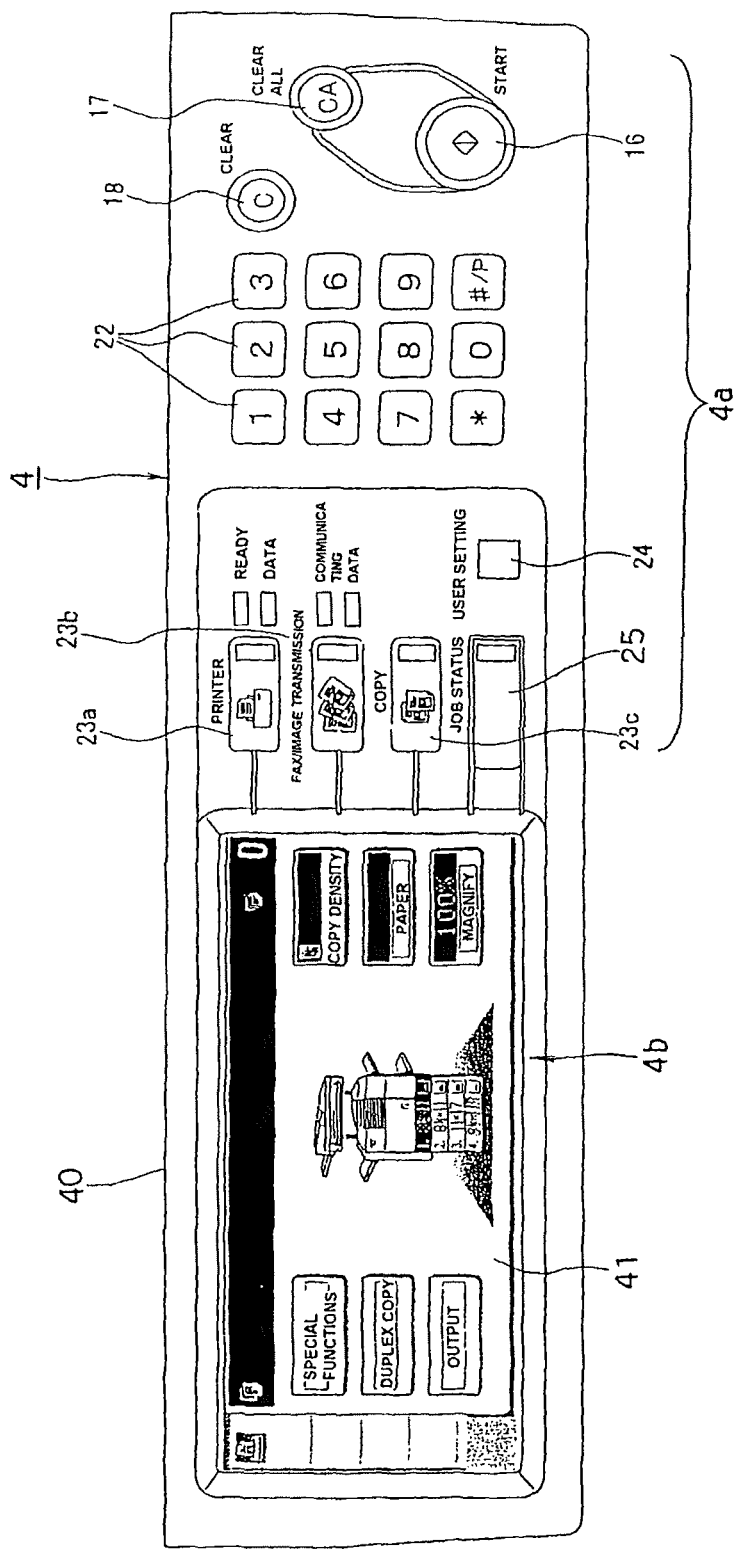
FIG. 2 is an explanatory view showing the structure of an operation unit according to the image processing device of the invention.

Next, with reference to FIG. 2, the structure of the operation unit 4a comprising the input unit 9a and display unit 4b is explained in detail.

FIG. 2 is an explanatory view illustrating the operation unit 4 in detail. As explained earlier with reference to FIG. 1, the operation unit 4 comprises an input unit 4a and a display unit 4b, and the operation unit 4 is composed of an operation panel 40 as shown in FIG. 2.

The operation panel 40 includes a liquid crystal display panel 41 as shown in FIG. 2. The input unit 9a includes a group of keys that are disposed adjacent the LCD panel 41 (on the right side of FIG. 2), which include a "start" key 16 for demanding the device to start copying, an "all clear" key 17 for interrupting the process being executed, a "clear" key 18 for clearing the contents of the designated mode, a "ten" key 22 for designating the number of copies to be made etc., a "printer" key 23a, a "fax/image transmission" key 23b and a "copy" key 23c functioning as mode switching keys, a "job status" key 25 for confirming the status of the jobs (reserved jobs), and a "user setup" key 24.

The display unit 4b is composed of a dot-matrix LCD panel 91, capable of displaying a detailed guidance to provide necessary information to the user of the digital multifunctional device 1 according to the present embodiment.

Furthermore, a transparent touch panel (transparent tablet) is disposed on the screen of the LCD panel 41, which functions as a part of the input unit 4a for entering demands to the system by manipulating the touch panel according to the guidance information displayed on the panel 41.

Next, the security system equipped to the digital multifunctional device 1 according to the present embodiment will be explained.

As for the simplified process flow, the image data to be processed in the device is stored temporarily in the hard disk 12.

Thereafter, when the processing of the stored image data (output of the stored image data) is completed and the data no longer becomes necessary, the image data is erased (invalidated) from the hard disk 12.

At this time, the stored image data is erased (invalidated) by repeating the erase process for a number of times set according to the security level of each process mode (for example, copy mode, print mode, fax mode and scanner mode).

The following explanation refers to a copying operation in which the document image data is read into the device and then output through the printer as recorded matter, but the present embodiment is not limited to such example, and the same process can be applied when the present digital multifunctional device 1 is utilized as a printer or as a transmission device such as facsimile or network scanner in which the image data read into the device via a scanner is transmitted.

FIGS. 3 through 13 illustrate the screens displayed on the LCD panel 41 of the display unit 4b of FIG. 2, which explain how the display 4b changes according to each step for erasing (invalidating) the unnecessary image data from the hard disk 12 according to its security level when the "image data erase process function" for erasing the image data temporarily stored in the hard disk 12 is active.

Figure 14:
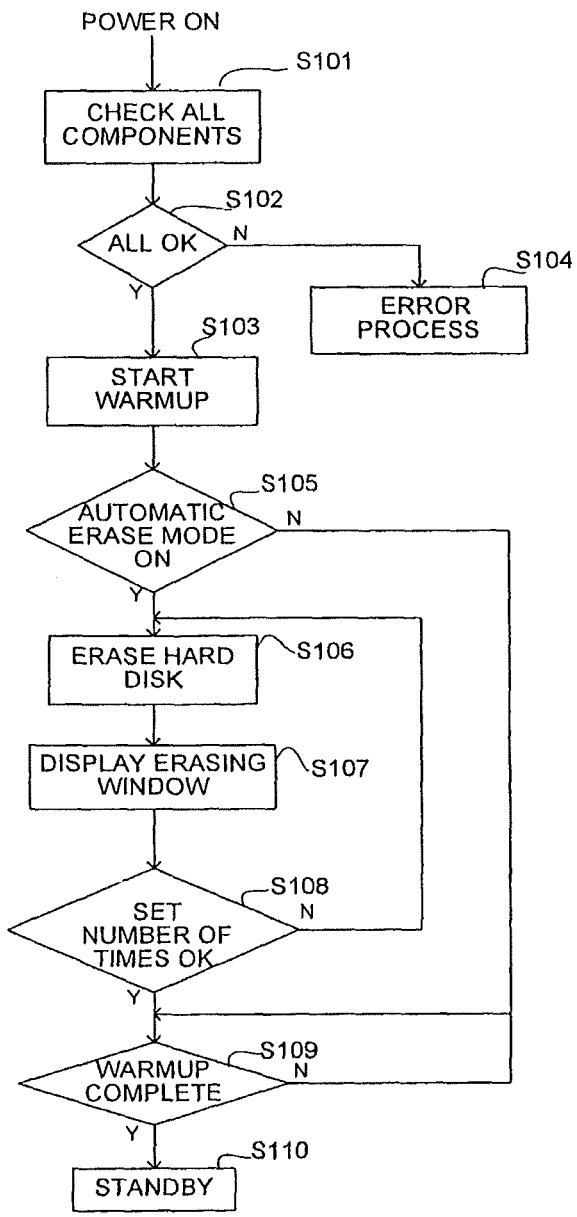
FIG. 14 is a flowchart (number 1) explaining the flow of the process for copy mode.
Figure 15:
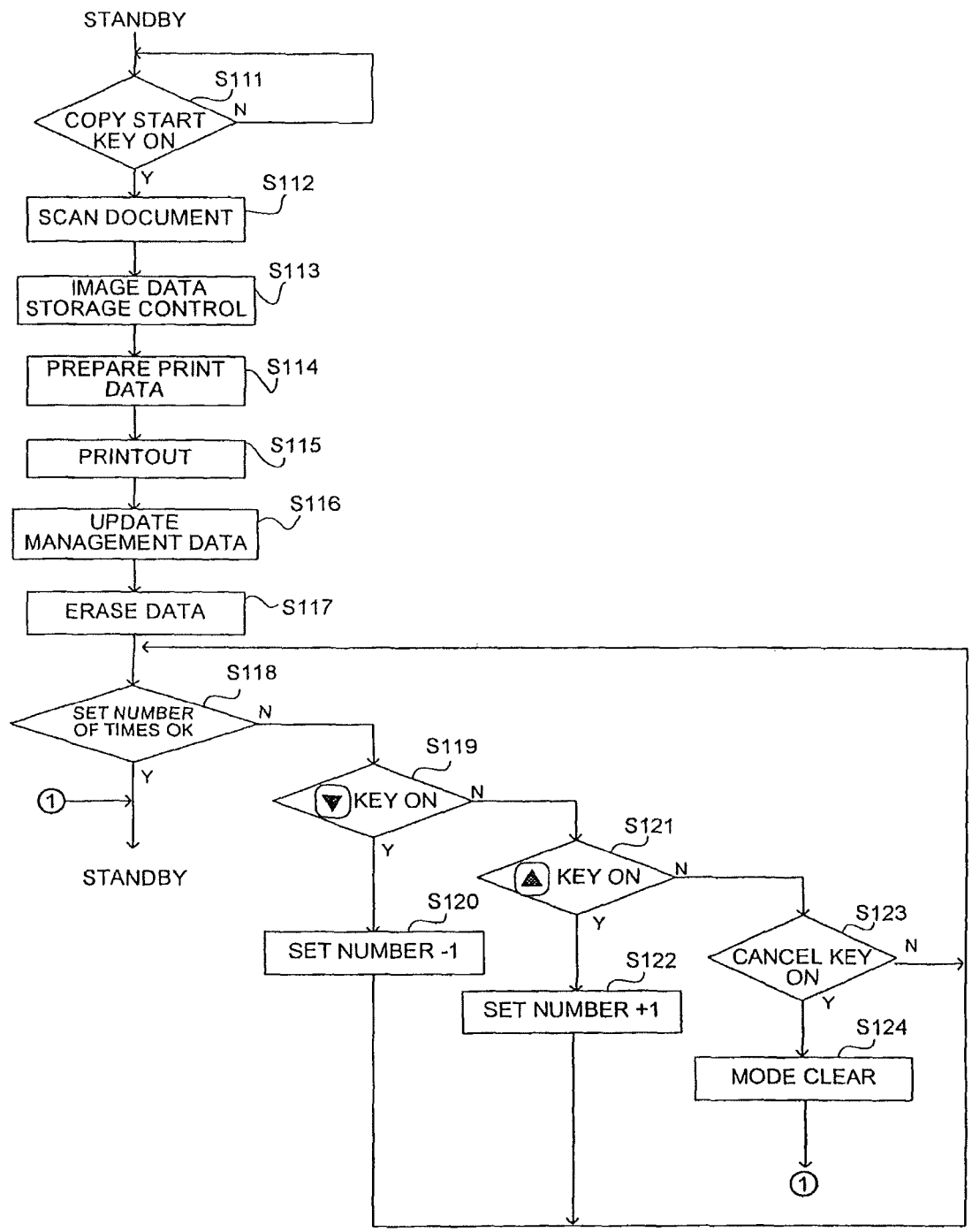
FIG. 15 is a flowchart (number 2) explaining the flow of the process for copy mode.

Further, FIG. 14 is a flowchart showing the sequence of process steps for erasing the image data on the hard disk 12 from the time the power of the digital multifunctional device is turned on and warm-up is started to the time the device is at standby being ready for operation, and FIG. 15 is a flowchart showing the sequence of process steps for performing a copy operation and then erasing the image data stored in the hard disk 12 by the digital multifunctional device 1 according to the present embodiment.

Figure 3:
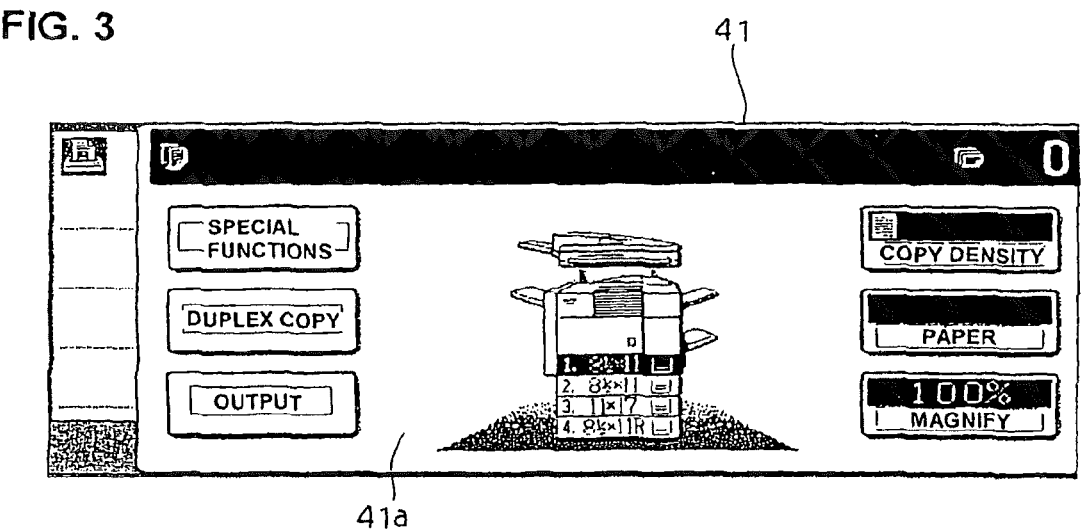
FIG. 3 is an explanatory view of a screen displayed on the LCD panel of FIG. 2 (normal status)

FIG. 3 shows a display screen (basic screen) 41a of the LCD panel 41 in which the "image data erase process function" has not yet been activated, and in the digital multifunctional device 1 according to the present embodiment, the "image data erase process function" is a function that is preinstalled to the device, but is initially not active in default.

The "image data erase process function" can be activated by entering and setting a product key at the installation site when security regarding document data and the like is required. The art of selectively validating a preinstalled function with a product key is disclosed in the application (Japanese Patent Laid-Open No. 2001-309099) filed by the present applicant.

Figure 4:
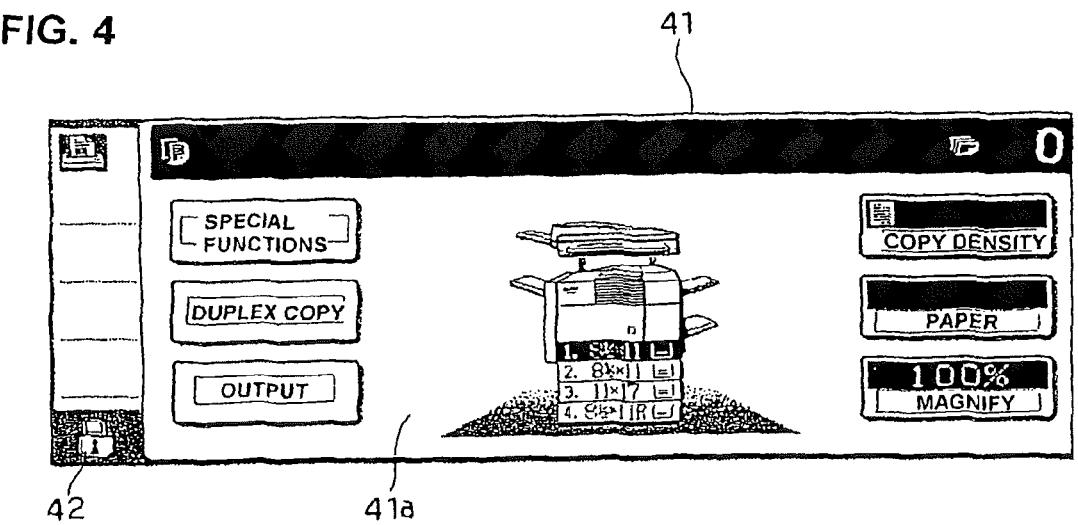
FIG. 4 is an explanatory view of a screen displayed on the LCD panel of FIG. 2 (status in which an icon is displayed indicating that "image data erase process" is operable)

FIG. 4 is a view showing the status in which an icon 42 indicating that the "image data erase process function" is in operable state is displayed on the lower left corner of the screen 41a of the LCD panel 41, notifying the user that the "image data erase process function" has been validated by the entry of the product key.

Figure 5:
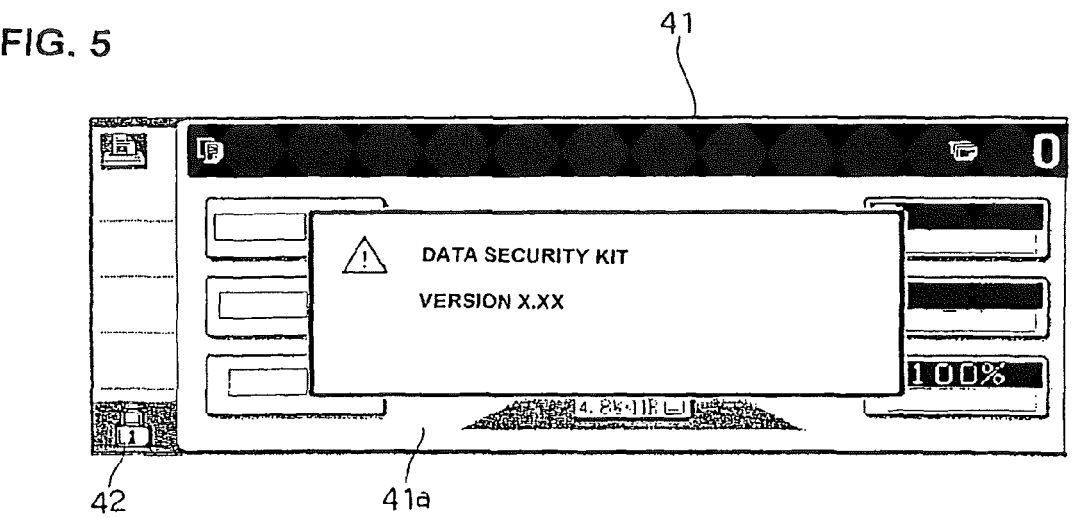
FIG. 5 is an explanatory view of a screen displayed on the LCD panel of FIG. 2 (version data display screen)

When a finger is pressed against (touches) the icon 42 displayed at the lower left corner of the screen 41a of the LCD panel 41 shown in FIG. 4 while the "image data erase process function" is not activated (when the device is at standby), the screen 41a of the LCD panel 41 is changed to what is shown in FIG. 5. Then, as shown in FIG. 5, a window is displayed substantially at the center of the screen 41a of the LCD panel 41 indicating the version data etc. of the present function related to the security kit.

The "image data erase process function" is handled as "data security kit", which is an option in the digital multifunctional device 1, so guidance thereof is displayed in the window as "data security kit". Thereby, the contents of the "data security kit" and the "image data erase process function", the version and the operation status thereof can be confirmed.

Figure 6:
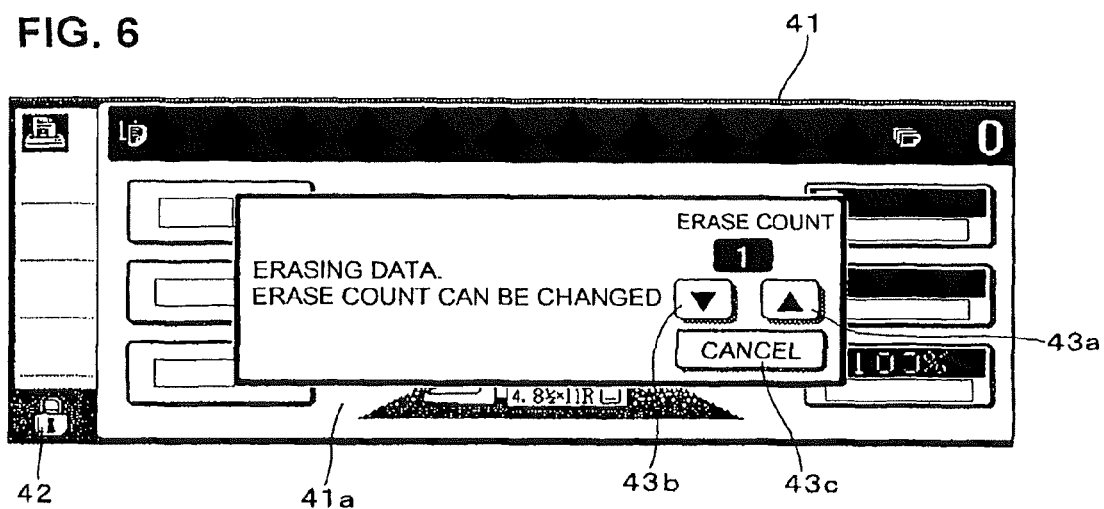
FIG. 6 is an explanatory view showing a screen displayed on the LCD panel of FIG. 2 ("image data erase process" operating screen)

When the "image data erase process function" is operating since a job has been completed or cleared (when the data stored in the hard disk 12 is being erased), a window is displayed at the substantial center of the screen 41a of the LCD panel 41 indicating that data is currently being erased, as shown in FIG. 6.

Moreover, if enabling the set number of times of erase to be changed in mid-flow, the window displays the number of times of erase process for the current job data (default number of times: once), and also displays an "up key" 43a, a "down key" 43b and a "cancel key" 43c for optionally changing the number of times of erase process to be performed by the decision of the user (default number of times: once).

Figure 7:
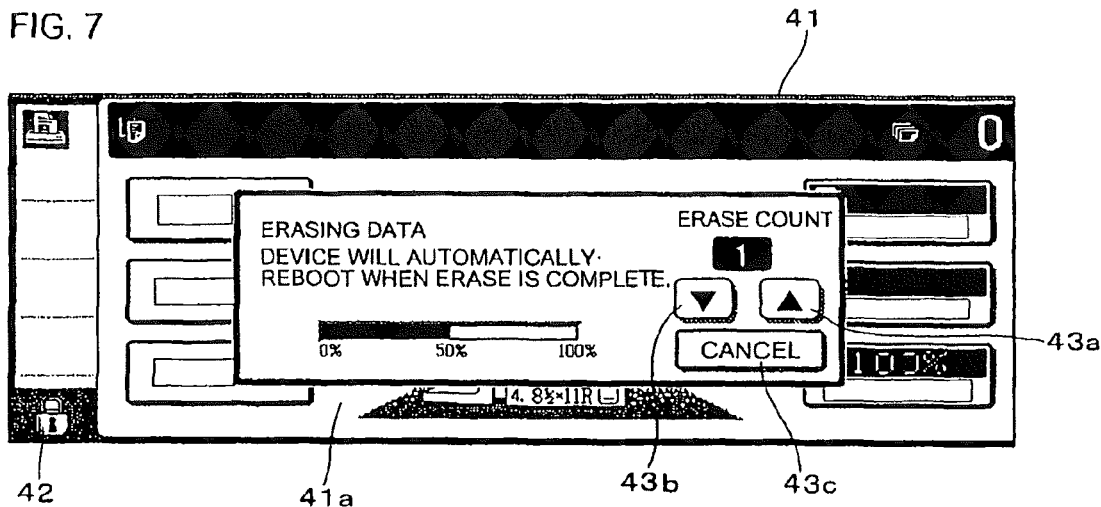
FIG. 7 is an explanatory view showing a screen displayed on the LCD panel of FIG. 2 ("image data erase process" operation status confirmation screen)

If the icon 42 on the lower left corner of the screen 41a of LCD panel 91 is pressed with a finger (touched) at this time, the screen 41a of the LCD panel 41 is changed to what is shown in FIG. 7. Here, as shown in FIG. 7, a window is displayed on the substantial center of the screen 41c of LCD panel 41 indicating that image data in the hard disk 12 is being erased according to the "image data erase process function", and the status of progress of the process is displayed in levels. This display enables the operation status of the erasing process according to the "image data erase process function" to be confirmed.

While the image data in the hard disk 12 is being erased by the "image data erase process function", it may be effective to have a display that is different from normal states, such as to have the icon blink during the erase procedure, so that one can recognize at once that the image data erasing process is underway.

Moreover, if the set number of times of erase is enabled to be changed in mid-flow, similar to the window of FIG. 6, the present window can display the number of times of erase process set for the current job data (default number of times: once), and also display an "up key" 93a, a "down key" 43b and a "cancel key" 43c for optionally varying the number of times of erase process by the decision of the user (default number of times: once). By manipulating the "up key" 43a and the "down key" 43b, the preset number of times for carrying out the erase process (invalidation process) for the unnecessary image data can be varied in mid-flow. Moreover, by manipulating the "cancel key", the erase process (invalidation process) being performed currently can be interrupted in mid-flow.

Figure 8:
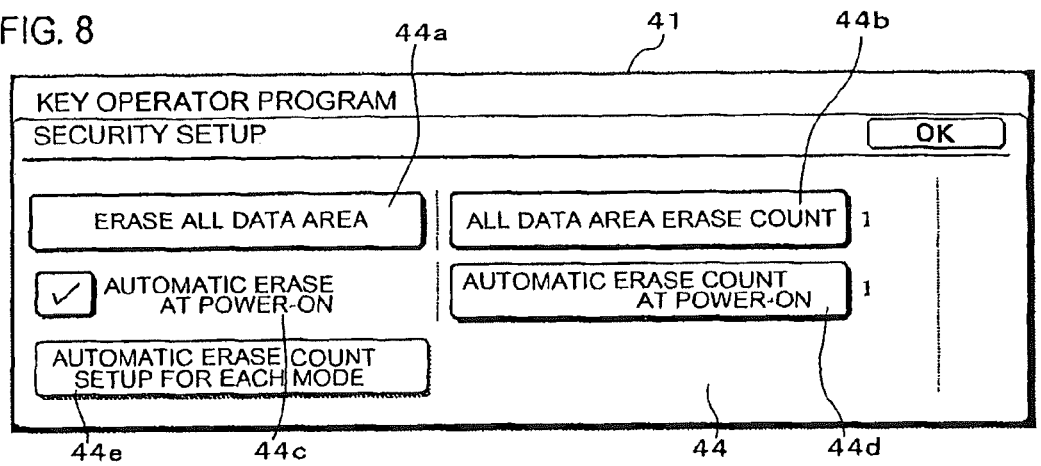
FIG. 8 is an explanatory view of a screen displayed on the LCD panel of FIG. 2 (security setup display screen)

Next, FIG. 8 illustrates a detailed setup display screen (security setup screen) 44 of the LCD panel 41, enabling one to arbitrarily set up the number of times for erasing (invalidating) the image data stored in the hard disk 12 based on the various security levels of the document data determined at the installation site, or to start the "image data erase process function" to forcibly erase (invalidate) the image data stored in the hard disk 12.

By setting in advance the number of times of erase that is most suitable for the selected security level at the installation site using the security setup screen 44, the image data will be erased repeatedly when that image data becomes unnecessary, so the security level at the installation site can be maintained, and the deterioration of the process level: of the image data of the device caused by the improvement of the security level can be suppressed to a minimum.

Further, the number of times of erase process can be varied arbitrarily by the user during the erase operation by manipulating the "up key" 43a, the "down key" 43b or the "cancel key" 43c displayed on the window shown in FIG. 6 and FIG. 7.

The following scene of use is exemplified. The erase process is started when a copy job for one document is completed, but in case a copy job for a new second document is waiting to be performed, the security level of the first document can be determined and changed arbitrarily by the user. If the user determines that the document is important, the user confirms the number of times of erase process being set, and increases the number. On the contrary, if the user determines that the level of importance is low, the user reduces the number of times of erase process. Furthermore, if the user feels that the erase process is not necessary, the user can cancel the erase process itself to start the copy operation of the next document.

Further, since the image data stored in the hard disk 12 can be erased (invalidated) at an arbitrary timing, the present embodiment is effective when the user wishes to process very important document data.

The following is a simplified explanation of the operations according to the various modes.
(All Data Area Erase Mode)

Figure 9:
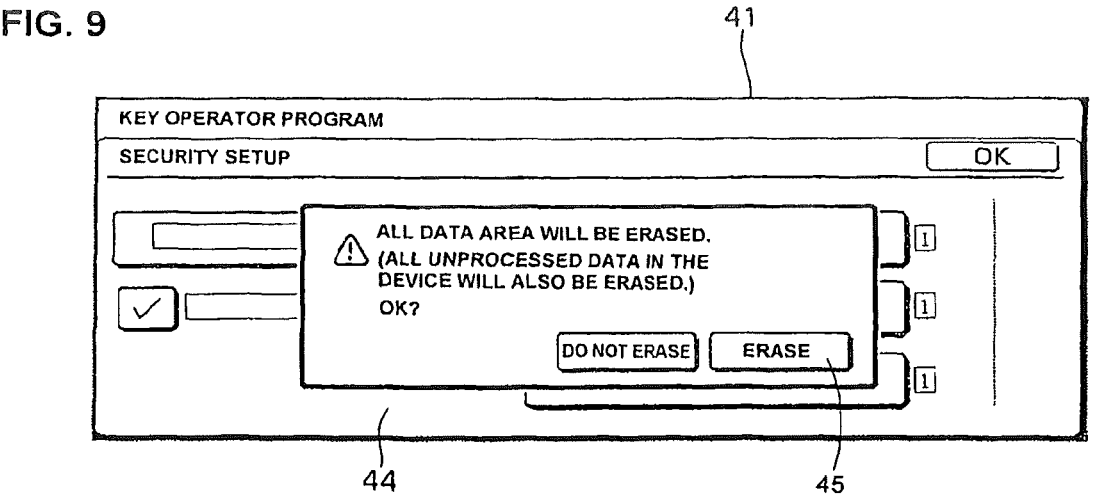
FIG. 9 is an explanatory view of a screen displayed on the LCD panel of FIG. 2 (erase confirmation screen)
Figure 10:
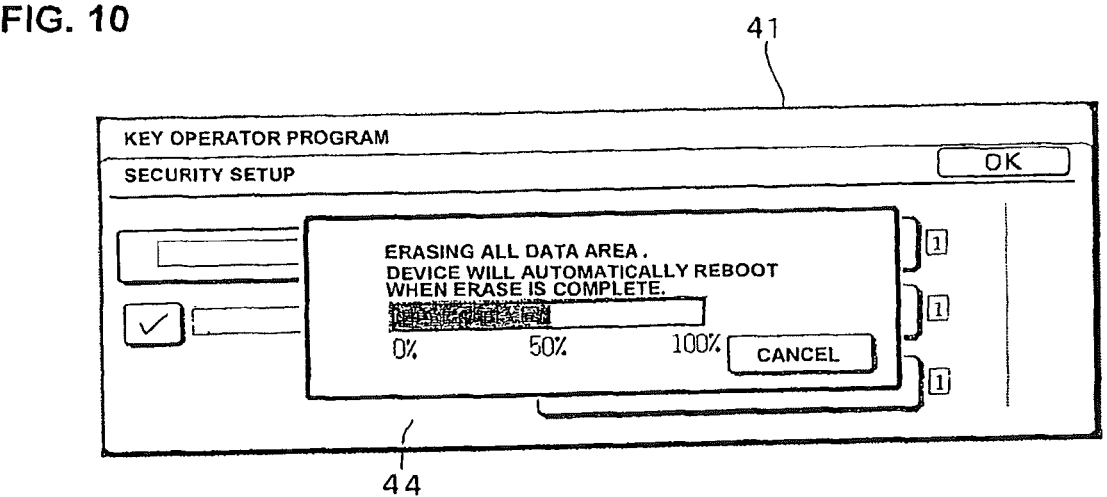
FIG. 10 is an explanatory view of a screen displayed on the LCD panel of FIG. 2 (data erase operation progress status display screen)

When the "all data area erase" key 44a displayed on the upper left area of the security setup screen 44 on the LCD panel 41 shown in FIG. 8 is pressed (touched), the image data written (remaining) on the hard disk 12 at that time is totally erased (invalidated). At this time, a confirmation window is displayed temporarily on the center of the security setup screen 44 of the LCD panel 41 (FIG. 9), and when the "erase" key 45 shown in FIG. 9 is manipulated, the erasing of image data on the hard disk 12 is started. At this time, the security setup screen 44 of the LCD panel 41 is changed to what is shown in FIG. 10, and indicates in levels the progress status of the data erase operation of the hard disk 12 by a window screen.

Furthermore, as shown in FIG. 8, on the right side of the "all data area erase" key 44*a* on the security setup screen 44 of the LCD panel 41 appears an "all data area erase count" key 44*b* for setting, between numbers 1 through 7, for example, the number of times for repeatedly executing the "all data area erase" process. Next to the "all data area erase count" key 44*b* is displayed the number being set (the default value is "1").

Figure 11:
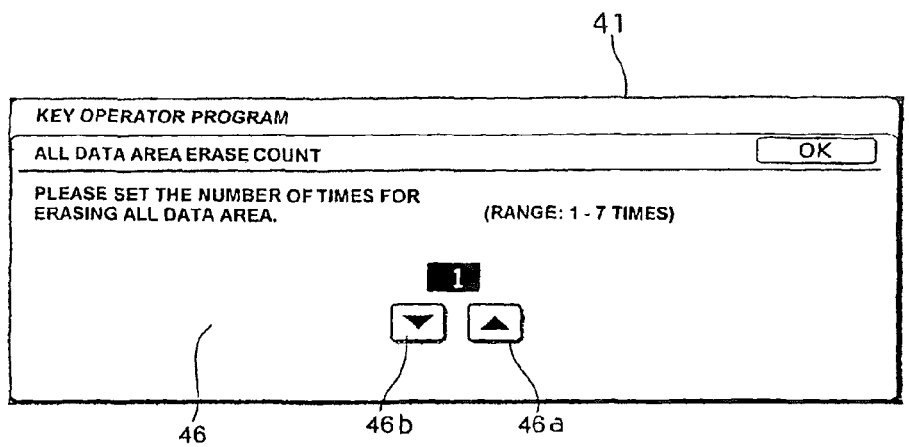
FIG. 11 is an explanatory view of a screen displayed on the LCD panel of FIG. 2 ("all data area erase count" setup screen)

When the "all data area erase count" key 44*b* on the security setup screen 44 is pressed by a finger (touched), the security setup screen 44 on the LCD panel 41 changes to the "all data area erase count" setup screen 46 as shown in FIG. 11, and by manipulating an "up" key 46*a* or a "down" key 46*b* of the "all data area erase count" setup screen 46, the number of times for erasing the data can be determined arbitrarily, for example, between numbers 1 through 7.

(Automatic Data Erase Mode at Power-on)

When an "automatic erase at power-on" key 49*c* displayed at the middle of the security setup screen 44 on the LCD panel 41 as shown in FIG. 8 is pressed (touched), a checkmark appears in the box of the key, and it becomes possible to set up an automatic data erase mode in which the image data on the hard disk 12 is erased every time the power of the digital multifunctional device 1 is turned on.

On the right side of the "automatic erase at power-on" key 44*c* of the security setup screen 44 on the LCD panel 41 is displayed, as shown in FIG. 8, a "number of times of automatic erase at power-on" key 44*d* that enables the number of times for repeatedly executing the "automatic erase at power-on" to be set up, for example, between numbers 1 through 7. The number of times being set up is displayed next to the "number of times of automatic erase at power-on" key 44*d*. (According to the default status, the automatic power-on erase mode is not activated and the number is "0", but when the automatic erase mode at power-on on the left side is selected, a number "1" is set.)

When the "number of times of automatic erase at power-on" key 44*d* on the security setup screen 44 is pressed (touched), the security setup screen 44 on the LCD panel 41 changes to the "all data area erase count" setup screen 46 as shown in FIG. 11, and by manipulating the "up" key 46*a* or the "down" key 46*b* on the "all data area erase count" setup screen 46, the number of times for executing erase can be determined arbitrarily, for example, between numbers 1 through 7.

(Automatic Data Erase Mode at Termination of Each Job for Each Process Mode)

When an "automatic erase count for each mode" key 44*e* displayed on the lower area of the security setup screen 44 on the LCD panel 41 shown in FIG. 8 is pressed (touched), the number of times for erasing from the hard disk 12 the data related to a completed job whenever a job of a process (output of stored image data) based on the various process modes of the device 1 (such as the copy mode, print mode, fax mode and scanner mode) is completed can be set for each process mode.

When the "automatic erase count setup for each mode" key 44*e* of the security setup screen 44 on the LCD panel 41 is pressed (touched), the security setup screen 94 changes to the "automatic erase count for each mode" setup screen 47, and the "automatic erase count for each mode" setup screen 47 is displayed on the LCD panel 41, according to which the current status of the number of times of automatic erase being set up for each mode can be confirmed, and the key of the process mode that one wishes to change the set erase count for is manipulated and the erase count setup screen is displayed.

Figure 12:
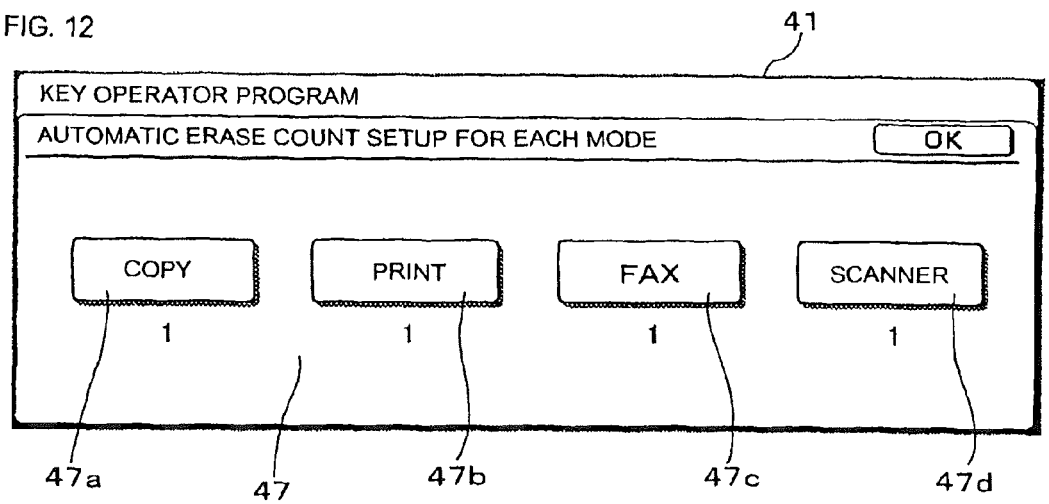
FIG. 12 is an explanatory view of a screen displayed on the LCD panel of FIG. 2 (screen for confirming the automatic erase count for each mode and for selecting the mode to be set)

Furthermore, in the "automatic erase count for each mode" setup screen 47 of the LCD panel 91, as shown in FIG. 12, the numbers being set up for repeatedly executing the automatic data erase mode when a job is completed according to each process mode (default setup value is "1") is displayed under the "coy mode" key 47*a*, the "print mode" key 47*b*, the "fax mode" key 47*c* and the "scanner mode" key 47*d*.

Figure 13:
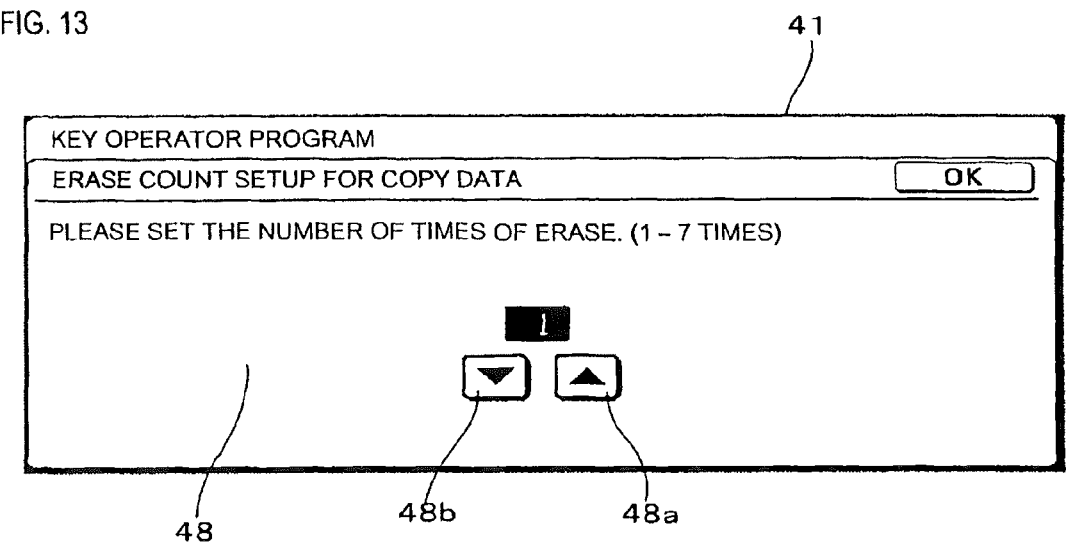
FIG. 13 is an explanatory view of a screen displayed on the LCD panel of FIG. 2 (screen for setting up the automatic erase count for the selected mode)

When the "copy mode" key 47*a* of the "automatic erase count for each mode" setup screen 47 is pressed (touched), the "automatic erase count for each mode" setup screen 47 of the LCD panel 41 changes to a "erase count for copy data" as shown in FIG. 13, and by manipulating the "up" key 48*a* or the "down" key 48*b* of the "erase count for copy data" setup screen 48 of the LCD panel 41, the number of times for erasing the data can be set arbitrarily for example between numbers 1 through 7.

Moreover, the similar setup can be performed for modes other than the "copy mode". According to the present embodiment, this automatic data erase mode at termination of each job is activated when the operation of the security kit (image data erase process) is approved by the entering of the product key explained earlier, but the present invention is not limited to such example, and it is possible to activate this mode from the initial state.

As explained above, by purchasing the "data security kit" for need of security, the "image data erase function" of the image processing device becomes operable, and the number of times for executing the "image data erase function" corresponding to the security level at the installation site or the security levels of various types of documents handled at the installation site can be set. Further, the number of times for executing the "image data erase function" corresponding to each process mode can also be set. Moreover, if necessary, it is also possible to designate when to start erasing the data on the hard disk.

Then, as explained before, the user can change (in mid-flow) the set number of times of erase arbitrarily during the erase operation arbitrarily by manipulating the "up key" 43*a*, the "down key" 43*b* and the "cancel key" 43*c* displayed on the window of FIGS. 6 and 7.

Now, with reference to the flowcharts of FIGS. 14 and 15, the process flow of a copy mode will be explained.

In FIG. 14, when the power of the digital multifunctional device 1 is turned on, at first, the device control unit 8 (FIG. 1) checks the components that constitute the device (step S101). When there is no problem found by the check (step S102 "Y"), warm-up is started so as to bring the device to a predetermined operable state (step S103). On the other hand, when malfunction (defect) is recognized (step S102 "N"), an error process is carried out, according to which a message window is displayed on the screen indicating that a malfunction (defect) is found and that confirmation is requested (step S104).

Next, during normal warm-up, it is checked whether the "automatic erase mode at power-on" for initializing the hard disk 12 at power-on is set or not (step S105), and if this mode is set, the initialization of the hard disk 12 is started (step S106), and at the same time, the status of progress of the initialization process is displayed as a window on the screen (step S107). At this time, the initialization by the erasing of data on the hard disk 12 is repeated for a number of times set in advance through the setup screen of the LCD panel 41 as shown in FIGS. 8 and 12 (step S108).

When the above process is completed, the basic screen display as shown in FIG. 4 is displayed on the screen 41*a* of the LCD panel 41 of the control panel 40, and when the completion of warm-up is confirmed (step S109), the device enters a job instruction standby state (step S110).

As shown in FIG. 15, during this stage (standby state), if a document is mounted on the set position on the image reading unit 2 of the digital multifunctional device 1, the copy mode for the document is set, and the "start" key 16 (FIG. 2) on the control panel 40 for instructing copy start is pressed (step S111), the document is electronically scanned by a CCD 2a of the image reading unit 2, and the document is generated as image data on the volatile memory 6a in page units (step S112). Then, the image data is stored temporarily on the hard disk 12 from the volatile memory 6a, and management information related to the image data stored in the hard disk 12 (such as FAT data) are managed by the managing unit 19 (step S113).

Next, the image data stored in the hard disk 12 is read out as print data onto the volatile memory 6a once again in timing with the recording (step S114), and in timing with the printer, the data is transferred to the LSU (laser scanning unit) of the print unit 6b and printed out (step S115).

When it is confirmed that the image data has been printed out via the printer, the management data such as the FAT data are updated as process complete (step S116), and when a sequence of printing processes has been completed, the memory region to which the image data used for this sequence of printing processes is stored is subjected to the image data erase process of the hard disk 12 (step S117). At this time, the initialization by the erasing of data on the hard disk 12 is repeated for a number of times set in advance for the copy mode through the setup screen of the LCD panel 41 shown in FIGS. 8, 12 and 13 (step S118).

If the number of times of erase operation must be changed in mid-flow while the initialization by erasing the data of the hard disk 12 is being performed for a number of times set in advance by the setup screen of FIG. 12, by manipulating the "down" key 43b displayed on the window of FIG. 6 or FIG. 7 (step S119), the set number of times can be reduced once per each click (step S120). By manipulating the "up" key 43a displayed on the window of FIG. 6 or FIG. 7 (step S121), the set number of times can be increased once per each click (step S122).

Further, by manipulating the "cancel" key 43c displayed on the window of FIG. 6 or FIG. 7 (step S123), the data erase process being performed currently is interrupted, or the erase process is terminated when the currently performed erase process in mid-flow is completed, the erase process is terminated and the device enters a standby mode (step S124).

When there is no need to change the set number of times of erase in mid-flow, the steps from S119 to S124 in the flowchart of FIG. 15 is omitted, and in step S118, whether the set number of times of erase has been reached or not is determined, and if no (N), the erase process is repeated, and if yes (Y), the device enters a standby mode.

The above description explains the automatic image data erase function performed when the processing of document image data by the copy mode is completed, but also according to other process functions for the image data by the digital multifunctional device 1, the data erase process is automatically carried out for a predetermined number of times when the processing of image data is completed and the data is no longer necessary.

Now we will briefly explain the data erase process, wherein the process is completed by erasing the image data stored in a memory region storing the image data to be erased that is no longer necessary due to completion of processing or interruption.

As for the means for erasing image data, methods such as formatting (clearing) the image data, overwriting white image data thereto, or overwriting unspecified pattern images created by random number generation, are applied.

In a hard disk device using magnetic recording, it is recommended that such erase operation is repeated so that past data is not distinguishable from residual magnetic field.

According to such environment, there are cases in which a user demands image data processing to be performed at a digital multifunctional device 1 located away from the user. Possible usages include output demand of print job by print mode and remote transmission demand of transmission document by fax mode, and these demands are entered from external devices PC1, PC2 and so on such as personal computers connected to the network 15 and transferred via the network 15.

In such case, upon sending image data from the personal computer or other external devices PC1, PC2 and so on to the digital multifunctional device 1 and demand transmission, printout and other operations, it is effective to enable simultaneous designation of the number of times for erasing the image data after the completion of the process. Thus, when ordering image data processing, the user demanding the process can also determine the conditions for erasing the image data according to the security level thereof.

Figure 16:
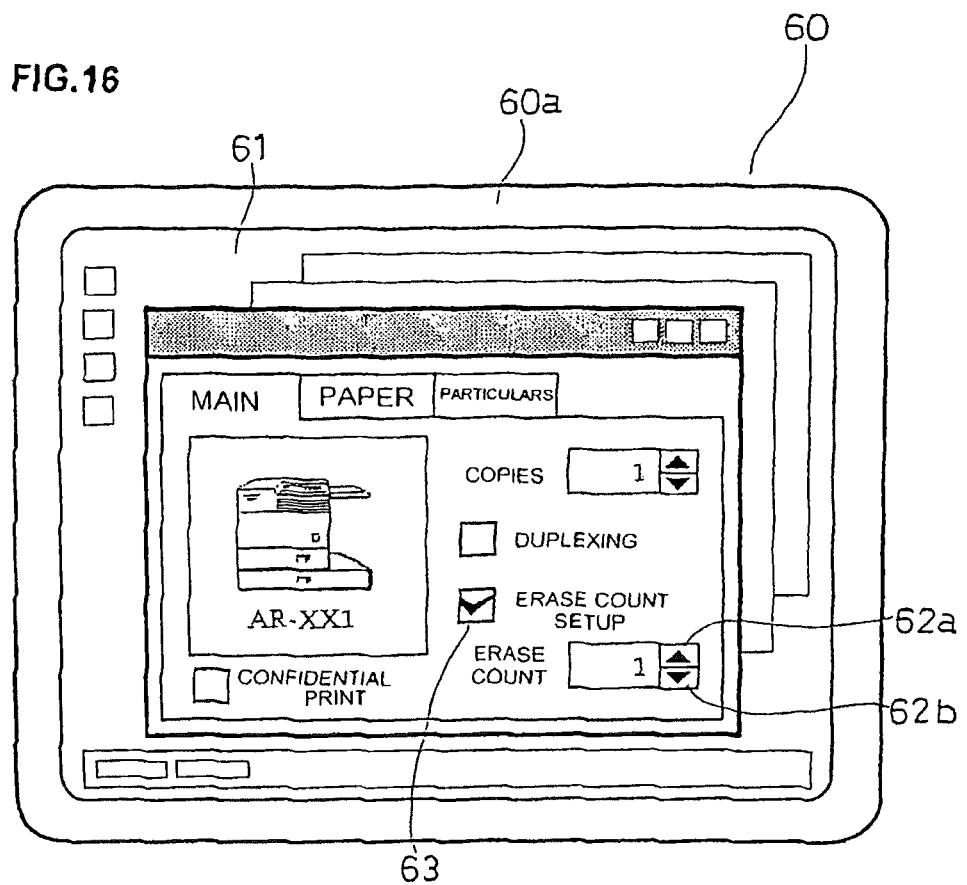
FIG. 16 is an explanatory view showing the setup screen (print driver screen) displayed on the display of an external device through which a print job is demanded.

Now, a case in which a print job is ordered is explained briefly with reference to FIG. 16. FIG. 16 is an explanatory view showing the setup screen (print driver screen) shown on the display of the external device through which the print job is to be ordered.

On the screen 60a of the display 60 of the personal computer or other external devices PC1, PC2 and so on, as shown in FIG. 16, a setup screen (print driver screen) 61 is displayed as a window, and on the setup screen (print driver screen) 61 of the display 60 of the external device, the "up key" 62a or the "down key" 62b beside the item "erase count" is clicked to set the number of times for erasing the image data, and a checkmark is entered in a checkbox 63 of the "erase count setup" to complete setting the number of times for erasing the image data.

Thus, in the print mode of the digital multifunctional device 1, for example, the conditions for erasing the image data after printout is completed can be set according to each image data from any personal computer or other external devices connected to the network 15.

Figure 17:
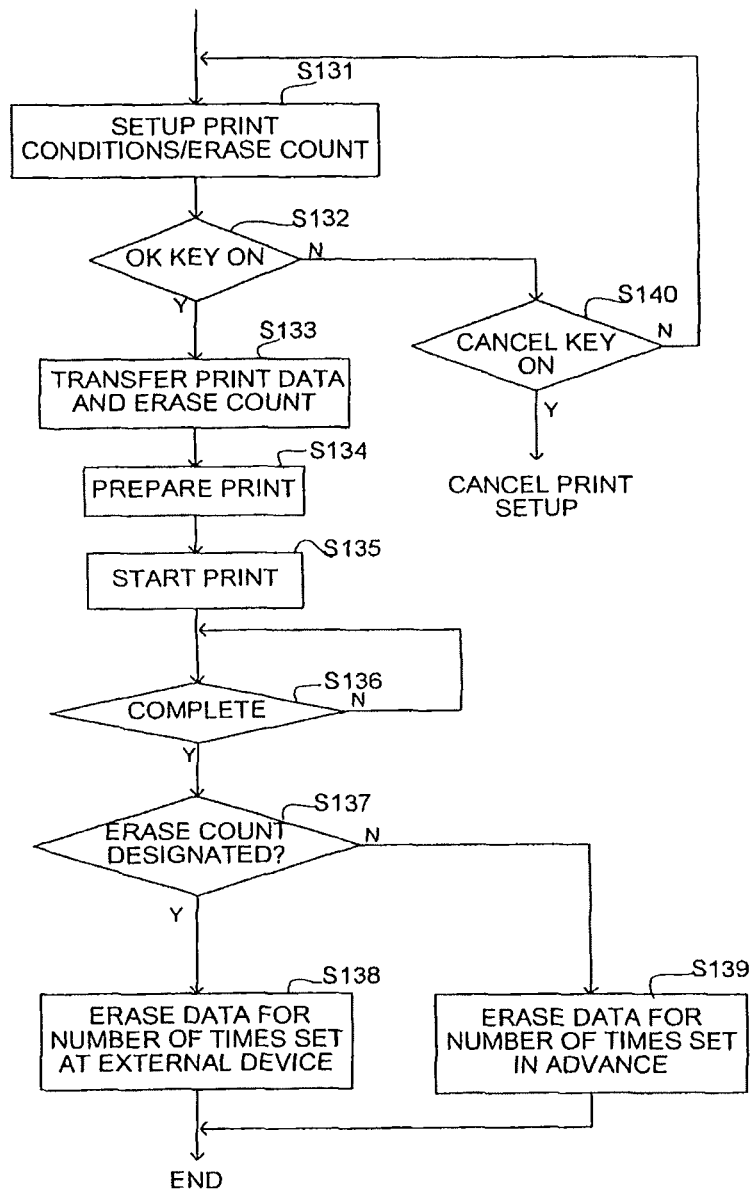
FIG. 17 is a flowchart explaining the flow of the process during print mode.

FIG. 17 is a flowchart explaining the flow of processes during print mode.

First, the print condition/number of times of erase of the image data is set on the setup screen (print driver screen) 61 displayed as window on the screen 60a of display 60 of the personal computer or other external devices PC1, PC2 and so on connected to the network 15 (step S131).

Next, when execution of print is ordered ("OK" key is clicked) on the setup screen (print driver screen) 61 on the screen 60a of display 60 of the external device (step S132 "Y"), the data regarding the print data and number of times of erase are transferred from the personal computer or other external devices connected to the network to the digital multifunctional device (step S133).

Thereafter, printout is prepared (step S134), and the ordered print job is processed according to conditions that allow the output process (step S135). When the ordered print job process is completed (step S136), if the number of times for erasing the image data is set at the external device (step S137 "Y"), the image data is erased according to the number of times of erase being set (step S138), and if the number of times for erasing the image data is not set at the external device (step S137 "N"), the image data is erased according to the erase conditions set in advance in the digital multifunctional device 1 (step S139).

Moreover, when the order for print (click of "OK" key) is not performed on the setup screen (print driver screen) 61 on the screen 60a of display 60 of the external device (step S132 "N"), and if the "cancel" key is clicked on the setup screen (print driver screen) 61 shown as window on the screen 60 of the display of the external device (step S140), the setting of the order for print conditions/number of times for erasing the image data is cancelled.

INDUSTRIAL APPLICABILITY

The present invention enables to increase the security level of the image data by repeatedly erasing the image data to be erased stored in the image data storage means according to its security level, thereby erasing the stored image data without fail.

The present invention enables to set the number of times for erasing the image data by the erasing means arbitrarily according to each image data process mode, so that the security level can be enhanced according to the environment of the installation site, while cutting out too much erasing operations so as not to deteriorate the efficiency to process the image data by the device.

The present invention enables the number of times of data erase set by the erase count control means to be changed in mid-flow, so the number of times for performing erase operation can be increased or decreased during erase of stored image data, thus improving the security of the image data. Moreover, the invention prevents the process efficiency of the device to be deteriorated by omitting too much erase operation.

According to the present invention, the image data erase means can accept the image data and the number of times for erasing the image data from the external device via the image data communication means, so simultaneously as when the image data processing is ordered from the external device, the number of times for erasing the image data based on the security level can be designated from the external device. Thus, based on the number of times for erasing the image data designated from the external device, the image data erase means erases the unnecessary image data stored in the image data storage means repeatedly, so that the data is erased without fail, and sufficient protection of the confidentiality of the data is achieved.

Furthermore, the security level of the device with respect to the image data received from the external device via the image data communication means can be improved.

Moreover, regarding image data subjected to image processing ordered from an external device located remotely from the image processing device, the number of times for erasing the image data can be set remotely according to the security level thereof, so the user is not required to confirm at the device the number of times for erasing the image data, and the order for processing the image data can be performed efficiently.

According to the present image processing device, the image data erase means receives the designated number of times for erasing image data set through the image data erase count setup means of the device body, and also receives the image data and the designated number of times for erasing image data from the external device via the image data communication means. Thus, the number of times for erasing the image data according to its security level can be designated through the external device simultaneously as when the image data processing is ordered, and the image data erase means prioritizes the designated number sent from the external device over the number of times for erasing the image data predetermined in the image data erase count setup means, so the unnecessary image data to be erased stored in the image data storage means can be erased repeatedly according to the security level designated from the external device, and the security level can be enhanced.

According to the present image processing device, the image data storage means is formed of a memory unit equipped with a magnetic memory medium, so the image data stored in the memory unit with the magnetic memory medium can be erased without fail, and the security level of the image data is improved.

According further to the present image processing device, the number of times for erasing the image data is the number of times for either erasing or overwriting the memory region that stores the unnecessary image data to be erased, so the number of times for erasing the image data can be determined and changed arbitrarily according to the security level of the image data.

What is claimed is:

1. An image processing device comprising:
   an image data input unit which inputs image data;
   a data storage unit which stores the data inputted through the image data input unit;
   a data processing unit which processes the data stored in the data storage unit; and
   a data erasing unit which erases the data stored in the data storage unit;
   wherein the data erasing unit includes an erase control unit which repeatedly executes an erasing procedure with respect to the data stored in the data storage unit repeatedly for a number of times of data erase set in advance, and an erase count setting unit which changes the number of times of data erase set in advance, and
   the change of the number of times of data erase with the erase count setting unit is capable of being performed at an installation site during a standby state of the device.

2. The image processing device according to claim 1, wherein the erase procedure of the image data by the erase control unit is overwriting the image data stored in the data storage unit that became unnecessary.

3. The image processing device according to claim 1, wherein the erase procedure of the image data by the erase control unit is overwriting a white data to the image data stored in the image data storage unit that became unnecessary.

4. The image processing device according to claim 1, wherein the number of times of data erase which is set by the erasing count setting unit is a number of times of overwriting an unspecified pattern image formed by random number generation to the image data stored in the data storage unit that became unnecessary.

5. An image processing device comprising:
   an image data input unit which inputs image data;
   an image data storage unit which stores the image data inputted through the image data input unit;
   an image data processing unit which outputs the image data stored in the image data storage unit; and
   an image data erasing unit which erases the image data stored in the data storage unit;
   wherein the image data erasing unit includes an erase control unit which repeatedly executes an erasing procedure with respect to the image data stored in the image data storage unit repeatedly for a number of times of data erase set in advance, and an erase count setting unit which changes the number of times of data erase, the change of the number of times of data erase with the erase count setting unit is capable of being performed at an installation site, and the erase control unit automatically executes the erase procedure at the number of times of data erase set by the erase count setting unit, when the data processing unit completes a processing of the image data and the image data is no longer necessary.

6. The image processing device according to claim 5, wherein the erase procedure of the image data by the erase control unit is overwriting the image data stored in the data storage unit that became unnecessary.

7. The image processing device according to claim 5, wherein the erase procedure of the image data by the erase control unit is overwriting a white data to the image data stored in the image data storage unit that became unnecessary.

8. The image processing device according to claim 5, wherein the number of times of data erase which is set by the erasing count setting unit is a number of times of overwriting an unspecified pattern image formed by random number generation to the image data stored in the data storage unit that became unnecessary.

9. An image processing device comprising:
a data input unit which inputs an image data;
a data storage unit which stores the data input from the data input unit; and
a data erasing unit which erases all the data stored in the data storage unit;
wherein the data erasing unit includes an erase control unit which repeatedly executes an erasing procedure with respect to the data stored in the data storage unit repeatedly for a number of times of data erase set in advance, and an erase count setting unit which changes the number of times of data erase, the change of the number of times of data erase with the erase count setting unit is capable of being performed at an installation site, the erase control unit comprises a manual instructing unit which instructs an initiation of the erase procedure with respect to the data during a standby state of the device, and when the instruction of the initiation is input from the manual instructing unit, the erase control unit repeats the erasing process at the number of times of data erase set by the erase count setting unit, and executes the erasing procedure of all the data stored in the data storage unit.

10. The image processing device according to claim 9, wherein the erase procedure of the image data by the erase control unit is overwriting to all the image data stored in the image data storage unit that became unnecessary.

11. The image processing device according to claim 9, wherein the erase procedure of the image data by the erase control unit is overwriting a white data to all the image data stored in the image data storage unit that became unnecessary.

12. The image processing device according to claim 9, wherein the number of times of data erase which is set by the erasing count setting unit is a number of times of overwriting an unspecified pattern image formed by random number generation to all the data stored in the data storage unit that became unnecessary.

* * * * *